3,022,281
POLYMERIZATION PROCESS WITH A PEROXYDICARBONATE INITIATOR FORMED IN SITU

Edwin Studley Smith, Cuyahoga Falls, Ohio, assignor to The Goodyear Tire & Rubber Company, Akron, Ohio, a corporation of Ohio
No Drawing. Filed Nov. 24, 1958, Ser. No. 775,726
6 Claims. (Cl. 260—92.8)

This invention relates to a process of polymerizing polymerizable unsaturated monomers and particularly to the formation of a peroxydicarbonate initiator in situ in a polymerization system containing an aqueous phase and a monomer phase.

Polymerizable unsaturated monomers, as for example vinyl chloride, may be polymerized by means of a free radical polymerization initiator in a suspension, emulsion, or bulk polymerization system. The free radicals are usually generated by means of the decomposition of organic peroxides, such as lauroyl peroxide, which are soluble in the monomer phase of the polymerization system. It is conventional to add the polymerization initiator to the monomer phase before polymerization is started. Peroxydicarbonates are desirable polymerization initiators but many of these initiators when used in the manner described bring about the polymerization of the monomer with almost explosive force, particularly at room temperature, thus endangering the lives of operators and subjecting the equipment to possible destruction. The peroxydicarbonates are a preferred class of polymerization initiators and, therefore, it is most desirable to develop a method of controlling the rate of polymerization in a polymerization system employing the use of peroxydicarbonates at elevated temperatures.

It now has been discovered that the rate of polymerization in a polymerization system containing a water phase and a monomer phase may be controlled by adjusting the concentration of the reactants used to generate the organic peroxydicarbonate in situ. It is desirable to form the organic peroxydicarbonate from the necessary reactants, one of which is soluble in the water phase and the other of which is soluble in the monomer phase. It thus has been discovered that the concentration of the free radicals which must be generated to bring about polymerization may be easily and effectively controlled by adjusting the concentration of either or both reactants used in forming the peroxydicarbonate in situ.

The following example is illustrative of the present invention in which all parts are by weight unless otherwise indicated:

Example

A conventional glass-lined pressure vessel equipped with external heating and cooling means was first evacuated and then charged with 20 pounds of distilled water containing 13.5 grams of a suspension agent made up of 4.5 grams of Elvanol 32–70 (partially hydrolyzed polyvinyl acetate) and 9 grams of gelatin (85 Bloom Type B) and 15.0 grams of the buffering agent, sodium bicarbonate. To this water was then added 10 pounds of the polymerizable unsaturated monomer, vinyl chloride, and the mixture heated to 50° C. To this heated mixture was added 16.0 grams of a 3% water solution of hydrogen peroxide soluble in the water phase and 3.0 grams of ethyl chloroformate soluble in the monomer phase. The reaction mixture was maintained at an operating temperature of 50° C. for 16 hours after which time 81% of the vinyl chloride had been converted to polyvinyl chloride having an inherent viscosity of 1.10, when measured using 0.2 gram of polyvinyl chloride in 100 cc. cyclohexanone, and relatively low color when measured on the compounded resin with a Gardner Color Difference Meter.

The foregoing example shows a method of controlling the concentration of free radicals produced by the decomposition of diethyl peroxydicarbonate by adjusting the concentration of the ethyl chloroformate in the monomer phase of the reaction mixture and/or adjusting the concentration of hydrogen peroxide in the water phase of the reaction mixture. If the same concentration of preformed diethyl peroxydicarbonate had been added to the reaction mixture at 40° C., an explosive reaction would have taken place and the resulting polymer would have been of a darker color than that produced above.

Organic peroxydicarbonates that may be generated in situ by reacting a peroxide, such as hydrogen peroxide or sodium peroxide, with an alkyl-haloformate having the general formula

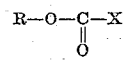

are the peroxydicarbonates of monohydric alcohols containing less than about 18 carbon atoms. The organic peroxydicarbonates useful in this invention have the general formula

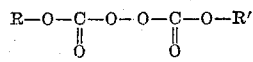

where R and R' are organic radicals including such alkyl radicals as methyl, ethyl, isopropyl, normal propyl, isobutyl, normal butyl, lauryl, amyl, hexyl, nonyl, and heptyl; heterocyclic, aromatic, and cycloaliphatic derivatives such as benzyl, cyclohexyl, tetrahydrofurfuryl, and cinnamyl radicals. Each of these organic peroxydicarbonates may be made in situ in the polymerization system of this invention by adding a peroxide, such as hydrogen peroxide or sodium peroxide, to the water phase of the polymerization system and adding the desired haloformate to the monomer phase.

The process of controlling the concentration of polymerization initiator by forming the organic peroxydicarbonate in situ in the polymerization system finds widespread use in any polymerization system containing a water phase and an oil phase made up of a polymerizable unsaturated monomer which polymerizes in the presence of a free radical polymerization initiator of the type disclosed here.

The method of this invention is applicable to those monomeric materials which contain a single methylene group attached to a carbon atom by a double bond; that is, compounds which contain a single $CH_2=C<$ group, and particularly a single $CH_2=CH—$ group, and which in each case undergo addition polymerization in aqueous dispersion to form high molecular weight linear polymers. The most important class of such materials consists of monomers containing a single olefinic double bond present in a $CH_2=C<$ group, in which the second carbon atom is attached by at least one of the free valences to an electronegative group, that is, a group which increases substantially the polar characteristics of the molecule. Among such monomers are the vinyl aromatics, such as styrene, p-chlorostyrene; esters of alpha-methylene aliphatic monocarboxylic acids, such as methyl acrylate, ethyl acrylate, n-butyl acrylate, isobutyl acrylate, dodecyl acrylate, 2-chlorethyl acrylate, 2-chloropropyl acrylate, 2,2'-dichlorisopropyl acrylate, phenyl acrylate, cyclohexyl acrylate, methyl alpha-chloroacrylate, methyl methacrylate, ethyl methacrylate, methyl ethacrylate; acrylonitrile; methacrylonitrile; acrylamide; vinyl esters, such as vinyl acetate, vinyl chloroacetate, vinyl propionate, vinyl butyrate; vinyl halides, such as vinyl chloride or vinyl bromide; vinyl ethers, such as vinyl methyl ether, vinyl isobutyl ether, vinyl 2-chlorethyl ether; vinyl ketones, such as vinyl methyl ketone, vinyl hexyl ketone, methyl isopropenyl ketone; isobutylene; vinylidene halides, such as vinylidene chloride, vinylidene chlorofluoride; N-vinyl compounds, such as N-vinyl pyrrole, N-vinyl carbazole, N-vinyl indole, N-vinyl succinimide; and other similar polymerizable materials. The method of this invention is also applicable to the copolymerization of mixtures of two or more of these monomeric materials.

The control of the polymerization of these polymerizable compounds, particularly vinyl chloride monomer, is brought about first by reason of the fact that the polymerization initiator is formed in situ in the polymerization system, thus supplying at a controlled rate the organic peroxydicarbonate which in turn decomposes substantially immediately upon its formation forming the free radicals necessary to bring about the polymerization. The rate of formation of the peroxydicarbonate is in turn controlled by the concentration of the reactive components needed in the formation of the organic peroxydicarbonate in the water and oil phases of the polymerization system. When using diethyl peroxydicarbonate as the source of free radicals suitable for bringing about the polymerization of, for example, vinyl chloride monomer, it is desirable to use from about 0.005 part to 1.0 part of diethyl chloroformate per 100 parts of monomer and it is preferred to use 0.05 part to 0.1 part per 100 parts of monomer and under the most economical and preferred conditions of polymerization it is desirable to use 0.066 part per 100 parts of monomer. When greater than 0.066 part of diethyl chloroformate is used per 100 parts of monomer, then the reaction time required to bring about the desired conversion of the monomer to polymer decreases from a preferred time of about 16 hours downwardly to about 2 hours, and when less than 0.066 part of diethyl chloroformate is used per 100 parts of monomer, then a greater length of time is necessary to bring about the desirable conversion of the monomer to polymer, which time may be controlled up to 100 hours.

It has been observed that the color of the resulting polymer, particularly polyvinyl chloride, is improved in that it becomes less dark with lower concentration of initiator. However, for reasons of economy and efficiency, it is desirable to use the conditions as shown in the example above.

Although it is known that the use of organic peroxydicarbonates as polymerization initiators is dangerous when used at temperatures of 25° C. and above, it has been discovered that these same organic peroxydicarbonates may be used in bringing about the polymerization of monomers at temperatures as high as 60° C. and, of course, at any temperature thereunder down to temperatures where polymerization still is affected.

Any suitable dispersing agent may be used in the process of this invention, such as sodium stearate, sodium oleate, ammonium oleate, potassium palmetate, sodium myristate, rosin, or dehydrogenated rosin soaps, gelatin, soluble starch, gum tragacanth, gum acacia, water soluble glycol cellulose, sodium alginate, agar agar, glue, Turkey red oil, the sodium salts of alkyl substituted naphthalene sulfonic acids, the sodium salts of reaction products of fatty acids of high molecular weight, and hydroxy substituted or amino substituted alkyl sulfonic acids. These dispersing agents may be used in concentrations ranging from 0.1 to 3% of the monomer present and the most economical amounts are those employing sufficient dispersing agent to bring about the most desirable dispersion of the monomer in the water phase.

To insure the formation of the desired organic peroxydicarbonate in situ in the polymerization system, any buffering agent capable of producing an alkaline medium above pH 7 may be used. Sodium bicarbonate, sodium hydroxide, sodium phosphate, and other similar agents may be used.

When using organic peroxides the preparation of the peroxide in situ permits one to use the rate of formation of the organic peroxide as a polymerization regulating mechanism, particularly since the decomposition of the peroxydicarbonate formed in situ takes place substantially immediately upon its formation. Therefore, the concentration of the free radicals resulting from the decomposition of the peroxydicarbonate is regulated by the rate at which the peroxydicarbonate is formed in situ which in turn is regulated by the concentration of the reactants used as, for example, ethyl chloroformate soluble in the oil phase and hydrogen peroxide soluble in the water phase which in an alkaline medium produces the diethyl peroxydicarbonate in situ.

In addition to insuring the safety of personnel as well as safeguarding the equipment needed in the process of this invention, the resulting polymer has a more desirable color property. Also economical advantages are realized because cheaper materials are required to bring about the same conversion per unit of time than is required when the preformed peroxydicarbonate is added at the beginning of the reaction.

An additional advantage realized in the process of this invention is in the adjustment of polymerization cycles most desirable for planned operation which otherwise is not achieved when using a preformed peroxydicarbonate.

While certain representative embodiments and details have been shown for the purpose of illustrating the invention, it will be apparent to those skilled in this art that various changes and modifications may be made therein without departing from the spirit or scope of the invention.

What is claimed is:

1. The polymerization as a separate monomer phase of an unsaturated monomer containing a single methylene group attached to a carbon atom by a double bond and polymerizable by peroxy compounds which comprises initiating the polymerization of the monomer as a separate monomer phase in an alkaline water phase by means of an organic peroxydicarbonate formed in the presence of the monomer by reacting an alkyl haloformate present in the monomer phase with a peroxide present in the water phase while maintaining the temperature of the dispersion at a value sufficient to bring about the reaction but below about 60° C. the haloformate in the monomer phase being present in amount from about 0.005 to about 1.0 part per 100 parts of monomer and sufficient peroxide present to react with the haloformate.

2. The method of polymerizing vinyl chloride as a separate monomer phase in an alkaline water phase which comprises forming an organic peroxydicarbonate in the presence of the vinyl chloride monomer phase by reacting an alkyl chloroformate present in the monomer phase with a peroxide present in the water phase while maintaining the water phase at a temperature sufficient to bring about the reaction but below about 60° C., the chloroformate in the monomer phase being present in an amount from 0.005 to 1.0 part per 100 parts of monomer and sufficient peroxide being present to react with the chloroformate.

3. The polymerization of vinyl chloride as a separate monomer phase in an alkaline water phase which comprises forming a dialkyl peroxydicarbonate in the presence of the vinyl chloride monomer phase by reacting hydrogen peroxide present in the water phase with an alkyl chloroformate present in the monomer phase at a temperature sufficient to bring about the reaction but below about 60° C. the chloroformate in the monomer phase being present in amount from about 0.005 to about 1.0 part per 100 parts of monomer and sufficient peroxide being present to react with the chloroformate.

4. The polymerization of vinyl chloride in a polymerization system containing water having suspended therein as a separate monomer phase vinyl chloride monomer, hydrogen peroxide and a buffering agent capable of maintaining the pH of the system above 7 and having ethyl chloroformate present in the monomer phase in an amount from 0.05 to 0.1 part per 100 parts of monomer at a temperature sufficient to bring about the reaction but below about 60° C.

5. The polymerization of vinyl chloride in a polymerization system containing water having suspended therein vinyl chloride as a separate monomer phase, hydrogen peroxide, and a buffering agent capable of maintaining the pH of the system above 7 and having present in the monomer phase ethyl chloroformate, at a temperature of about 50° C., 0.01 part of hydrogen peroxide being present in the water phase and 0.066 part of ethyl chloroformate being present in the monomer phase per 100 parts of monomer.

6. The method of polymerizing a polymerizable monomer containing a single methylene group attached to a carbon atom by a double bond as a separate monomer phase in an alkaline water phase, which comprises forming an organic peroxydicarbonate in the presence of the monomer phase by reacting an alkyl chloroformate present in the monomer phase with a peroxide present in the water phase, while maintaining the water phase at a temperature sufficient to bring about the reaction but below about 60° C., the chloroformate in the monomer phase being present in an amount from 0.005 to 1.0 part per 100 parts of monomer and sufficient peroxide being present to react with the chloroformate.

References Cited in the file of this patent

UNITED STATES PATENTS

| | | |
|---|---|---|
| 2,370,588 | Strain | Feb. 27, 1945 |
| 2,464,062 | Strain | Mar. 8, 1949 |

OTHER REFERENCES

Schildknecht: "Vinyl and Related Polymers," Wiley & Sons, New York (1952), pp. 244, 245, 262, 597 and 686.